United States Patent
Kerfoot, III et al.

(10) Patent No.: US 6,320,884 B1
(45) Date of Patent: *Nov. 20, 2001

(54) WIDE BANDWIDTH RAMAN AMPLIFIER EMPLOYING A PUMP UNIT GENERATING A PLURALITY OF WAVELENGTHS

(75) Inventors: Franklin W. Kerfoot, III; Howard Kidorf, both of Red Bank; Xiaobing Ma, Morganville; Karsten Rottwitt, Basking Ridge, all of NJ (US)

(73) Assignee: TyCom (US) Inc.,, Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/030,994

(22) Filed: Feb. 26, 1998

(51) Int. Cl.[7] ....................................... H01S 3/30
(52) U.S. Cl. ................... 372/3; 359/334; 385/15; 385/27
(58) Field of Search ................. 359/334; 372/3, 372/6, 23; 385/15, 27

(56) References Cited

U.S. PATENT DOCUMENTS

| 5,191,628 | * | 3/1993 | Byron | 385/27 |
|---|---|---|---|---|
| 5,323,404 | * | 6/1994 | Grubb | 372/6 |
| 5,623,508 | * | 4/1997 | Grubb et al. | 372/3 |
| 5,659,558 | * | 8/1997 | Tohmon et al. | 372/6 X |
| 5,898,714 | * | 4/1999 | Morita et al. | 372/6 |
| 5,912,910 | * | 6/1999 | Sanders et al. | 372/22 |
| 6,052,219 | * | 4/2000 | Kidorf et al. | 359/334 |
| 6,052,393 | * | 4/2000 | Islam | 372/6 |

FOREIGN PATENT DOCUMENTS 40 28 180 A1 * 3/1992 (DE) ........................... 372/3

OTHER PUBLICATIONS

E. A. Stappaerts et al, "Gain enhancement in Raman amplifiers with broadband pumping", Optics Letters, vol. 5, No. 1, Jan. 1980, pp. 4–6, Jan. 1980.*

* cited by examiner

Primary Examiner—John D. Lee

(57) ABSTRACT

A Raman amplifier is provided that includes at least a portion of optical fiber in which an optical signal travels. The optical fiber portion may encompass all or part of the optical transmission path of an optical communication system. A pump energy unit is provided that includes first and second pump sources providing pump power at first and second wavelengths, respectively. The first and second wavelengths generate first and second gain profiles in the optical fiber portion. The first and second gain profiles overlap in wavelength. An optical coupler couples the pump power to the optical fiber portion. Since the gain profiles overlap, the Raman amplifier has a greater bandwidth than can be achieved with a pump operating at a single wavelength.

14 Claims, 6 Drawing Sheets

BASIC RAMAN OPTICAL AMPLIFIER

WIDE BANDWIDTH RAMAN AMPLIFIER EMPLOYING A PUMP UNIT GENERATING A PLURALITY OF WAVELENGTHS

FIELD OF THE INVENTION

The present invention relates generally to optical amplifiers, and more particularly to a Raman amplifier having a relatively wide gain profile.

BACKGROUND OF THE INVENTION

Broad bandwidth optical transmission systems have received a great deal of attention in recent years. Such systems require broad bandwidth optical amplifiers to achieve transmission of high capacity wavelength division multiplexed signals. A type of optical amplifier that is commonly employed incorporates rare-earth doped optical fibers as the gain medium. In particular, the rare-earth material that is often selected is erbium. Rare-earth doped optical fiber amplifiers are often referred to as discrete or lumped amplifiers, in contrast to so-called distributed amplifiers in which signal amplification occurs along the signal transmission path. An example of a distributed amplifier is a Raman amplifier.

Raman amplification is accomplished by introducing the signal and pump energies along the same optical fiber. The pump and signal may be copropagating or counterpropagating with respect to one another. A Raman amplifier uses stimulated Raman scattering, which occurs in silica fibers when an intense pump beam propagates through it. Stimulated Raman scattering is an inelastic scattering process in which an incident pump photon loses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength. The relationship between the pump energy and the Raman gain for a silica fiber is shown in FIG. 1. The particular wavelength of the pump energy that is used in this example is denoted by reference numeral 1. As shown, the gain spectrum 2 for this particular pump wavelength is shifted in wavelength with respect to the pump wavelength.

The Raman gain spectrum in a lossless transmission fiber, as graphically illustrated in FIG. 1, may be expressed as follows:

$$G(\lambda) = e^{g_r(\lambda)PL/A} \quad (1)$$

where P is the optical pump power, L/A is the effective length divided by the effective cross-sectional area of the pump beam inside the fiber, and $g_r(\lambda)$ is the Raman gain coefficient, which is dependent on the material properties of the particular transmission fiber that is employed.

As FIG. 1 indicates, the bandwidth of the Raman amplifier is limited. For example, the bandwidth of the amplifier shown in FIG. 1 is only about 20 nm at 10 dB. Moreover, while much attention has been focused on expanding the bandwidth of rare-earth doped optical amplifiers, such a result has been difficult to achieve because of the properties of rare-earth doped fibers.

Accordingly, it would be desirable to provide an optical amplifier that has a gain profile with a wider bandwidth than is currently available from rare-earth doped fiber amplifiers and Raman amplifiers.

SUMMARY OF THE INVENTION

In accordance with the present invention, a Raman amplifier is provided that includes at least a portion of optical fiber in which an optical signal travels. The optical fiber portion may encompass all or part of the optical transmission path of an optical communication system. A pump energy unit is provided that includes first and second pump sources providing pump power at first and second wavelengths, respectively. The first and second wavelengths generate first and second gain profiles in the optical fiber portion. The first and second gain profiles overlap in wavelength. An optical coupler couples the pump power to the optical fiber portion. Since the gain profiles overlap, the Raman amplifier has a greater bandwidth than can be achieved with a pump operating at a single wavelength.

DETAILED DESCRIPTION

Figure 1:
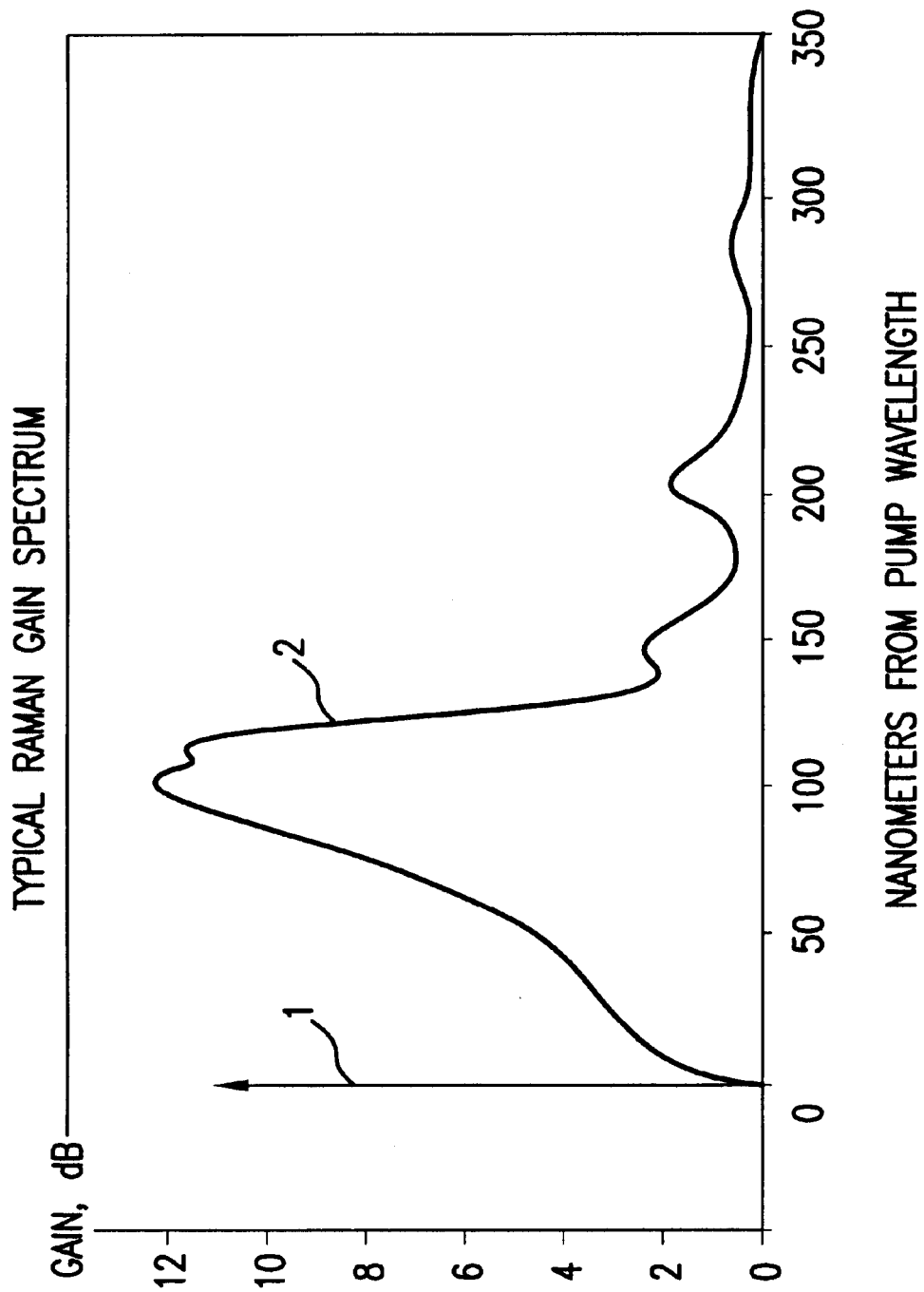
FIG. 1 shows the relationship between pump energy and Raman gain for a silica fiber.
Figure 2:
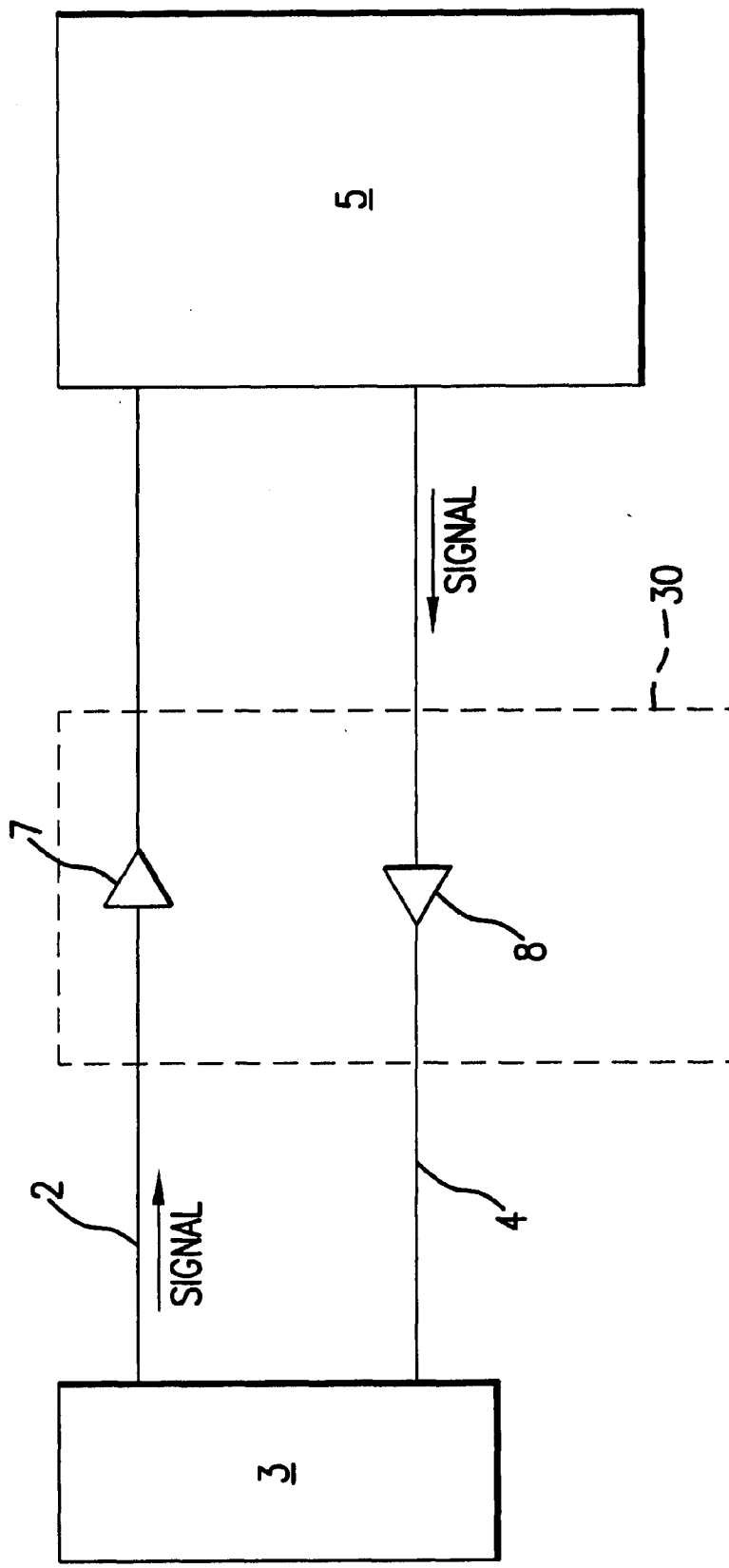
FIG. 2 shows an optical communication system that employs optical amplifiers.

Referring to FIG. 2, there is disclosed a conventional lightwave communication system which utilizes lumped optical fiber amplifiers such as rare-earth doped fiber amplifiers. The system includes transmitter/receiver terminals 3 and 5 and optical transmission fiber paths 2 and 4 supporting bi-directional communication. The signals being transmitted from the terminals 3 and 5 are in optical form. There is no intermediate conversion to electrical form. A plurality of lumped optical amplifiers 7 and 8 are interposed in the fiber paths 2 and 4 between the transmitter/receiver terminals 3 and 5. Optical amplifiers 7 and 8 contain a length of fiber that provides a gain medium, an energy source that pumps the fiber to provide gain, and a means of coupling the pump energy into the fiber without interfering with the signal being amplified. These components of the optical amplifiers are shown in greater detail in FIG. 3, in which the lumped optical amplifier is replaced with a distributed optical amplifier. While only one pair of optical amplifiers is depicted in FIG. 2 for clarity of discussion, it should be understood by those skilled in the art that the present invention finds application in transmission paths of all lengths having many additional pairs of optical amplifiers.

Figure 3:
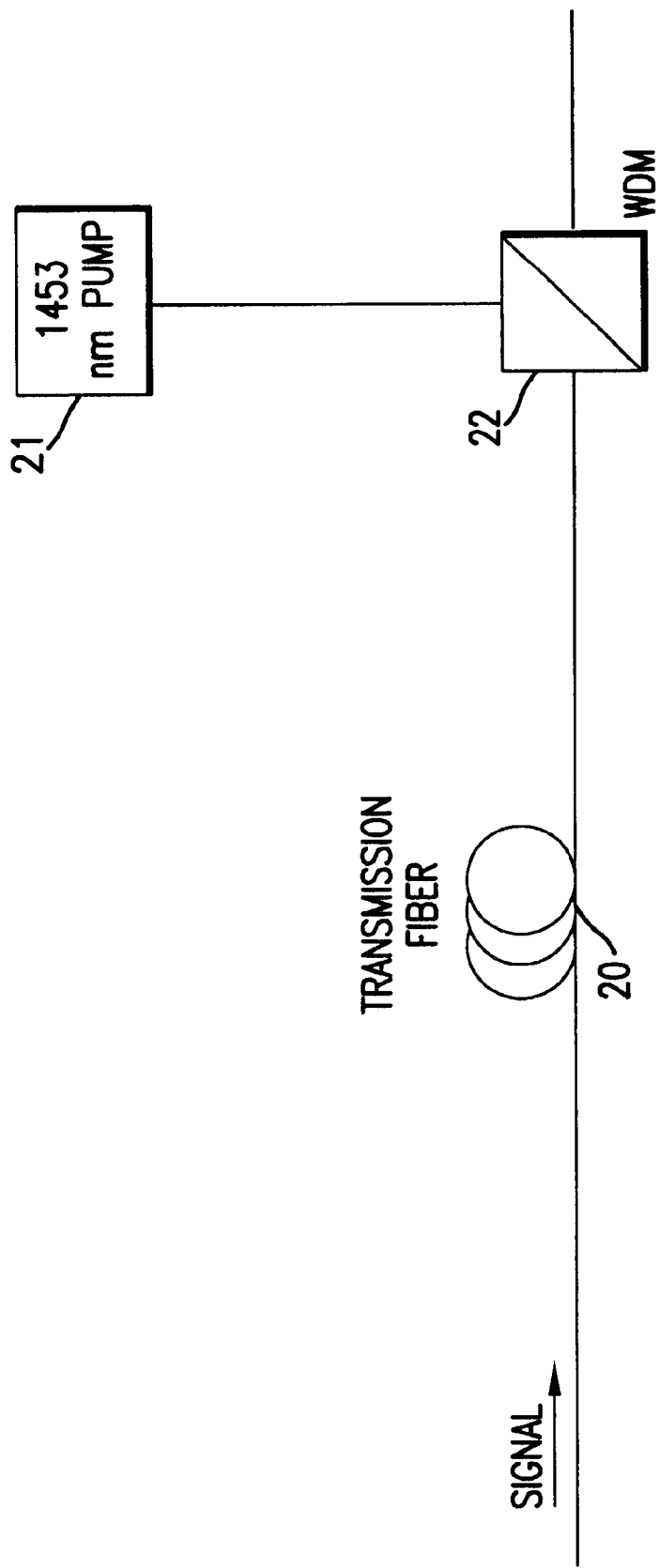
FIG. 3 shows the pertinent details of a known Raman amplifier.

Referring to FIG. 3, each distributed optical amplifier includes an optical fiber portion 20 of the transmission path in which Raman gain is to be generated. This portion 20 of fiber may vary in size and may be limited, for example, to a small section of the transmission path. Alternatively, the fiber portion 20 in which Raman gain is generated may have a length encompassing the entire transmission path. The fiber portion 20 is coupled to a source of optical pump energy 21 via a coupler 22 such as a wavelength division multiplexer (WDM).

Figure 4:
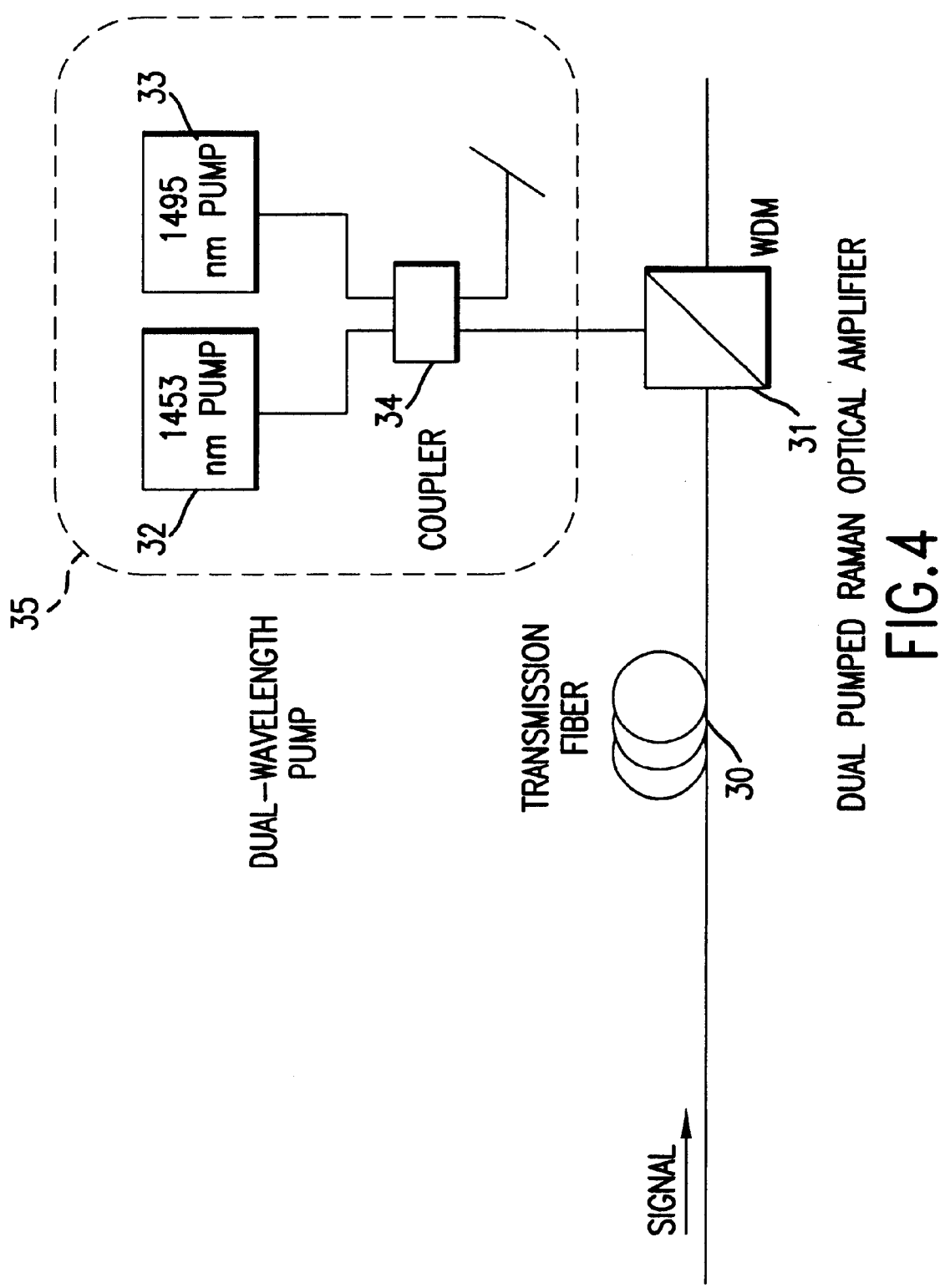
FIG. 4 shows a Raman amplifier constructed in accordance with the present invention.

FIG. 4 shows a Raman amplifier 100 constructed in accordance with the present invention. Pairs of Raman amplifiers 100 may be used in a transmission system such as shown in FIG. 2. Similar to FIG. 3, the Raman amplifier 100 includes optical fiber portion 30 in which Raman gain is generated and an optical pump unit 35 coupled to the fiber portion 30 by an optical coupler 31. In accordance with the present invention, the pump unit 35 includes first and second optical pump sources 32 and 33. An optical coupler 34 combines the energy from pump sources 32 and 33 and directs the resulting beam to optical coupler 31, which as previously noted may be a WDM coupler. As explained below, the pump sources 32 and 33 generate pump energy at different wavelengths selected to maximize the amplifier bandwidth.

The gain spectrum resulting from a two-wavelength pump source such as shown in FIG. 4 is approximately given by:

$$G(\lambda) = e^{g_r(\lambda - \lambda_1) P_1 L/A + g_r(\lambda - \lambda_2) L/A} \quad (2)$$

where $g_r$ is the Raman gain coefficient for the particular fiber material in which the gain is generated, $g_r(\lambda - \lambda_1)$ is the Raman gain coefficient arising from the first pump source 32 providing energy at a wavelength $\lambda_1$ and power $P_1$ and $g_r(\lambda - \lambda_2)$ is the Raman gain coefficient arising from the second pump source 33 providing energy at a wavelength $\lambda_2$ and power $P_2$. In one embodiment of the invention, pump source 32 provides pump energy at 1455 nm and pump source 33 provides pump energy at 1495 nm to amplify a WDM signal centered at about 1560 nm.

Figure 5:
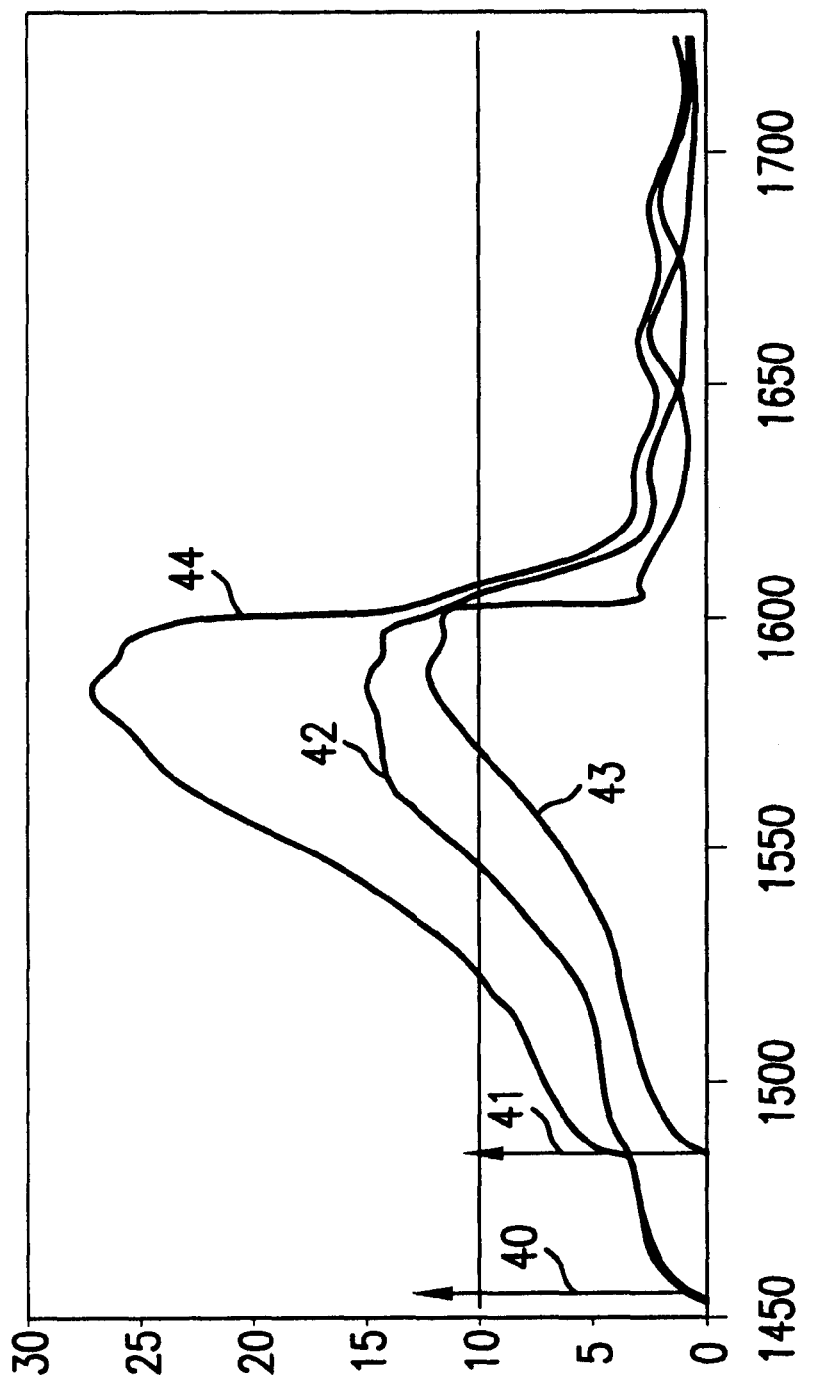
FIG. 5 shows the Raman gain provided by the amplifier shown in FIG. 4.

FIG. 5 shows the Raman gain provided by each of the pumps 32 and 33 individually and collectively. The pump energy provided by pump source 32 is denoted by reference numeral 40 and the pump energy provided by pump source 33 is denoted by reference numeral 41. The pump energies 40 and 41 generate in the transmission fiber gain spectra 42 and 43, respectively. In both cases the gain becomes substantial at a wavelength about 100 nm greater than each respective pump wavelength.

Composite gain spectrum 44 represents the addition of gain spectra 42 and 43. Gain spectrum 44 is derived from (2) above. As is evident from FIG. 5, one advantage of the present invention is that the bandwidth of the gain (measured at 10 dB) is substantially greater for composite gain spectrum 44 than for the individual gain spectra 42 and 43. Accordingly, by providing two pump sources operating at different wavelengths, the inventive amplifier has a wide bandwidth more suitable than discrete erbium doped amplifiers for use in optical transmission systems.

Figure 6:
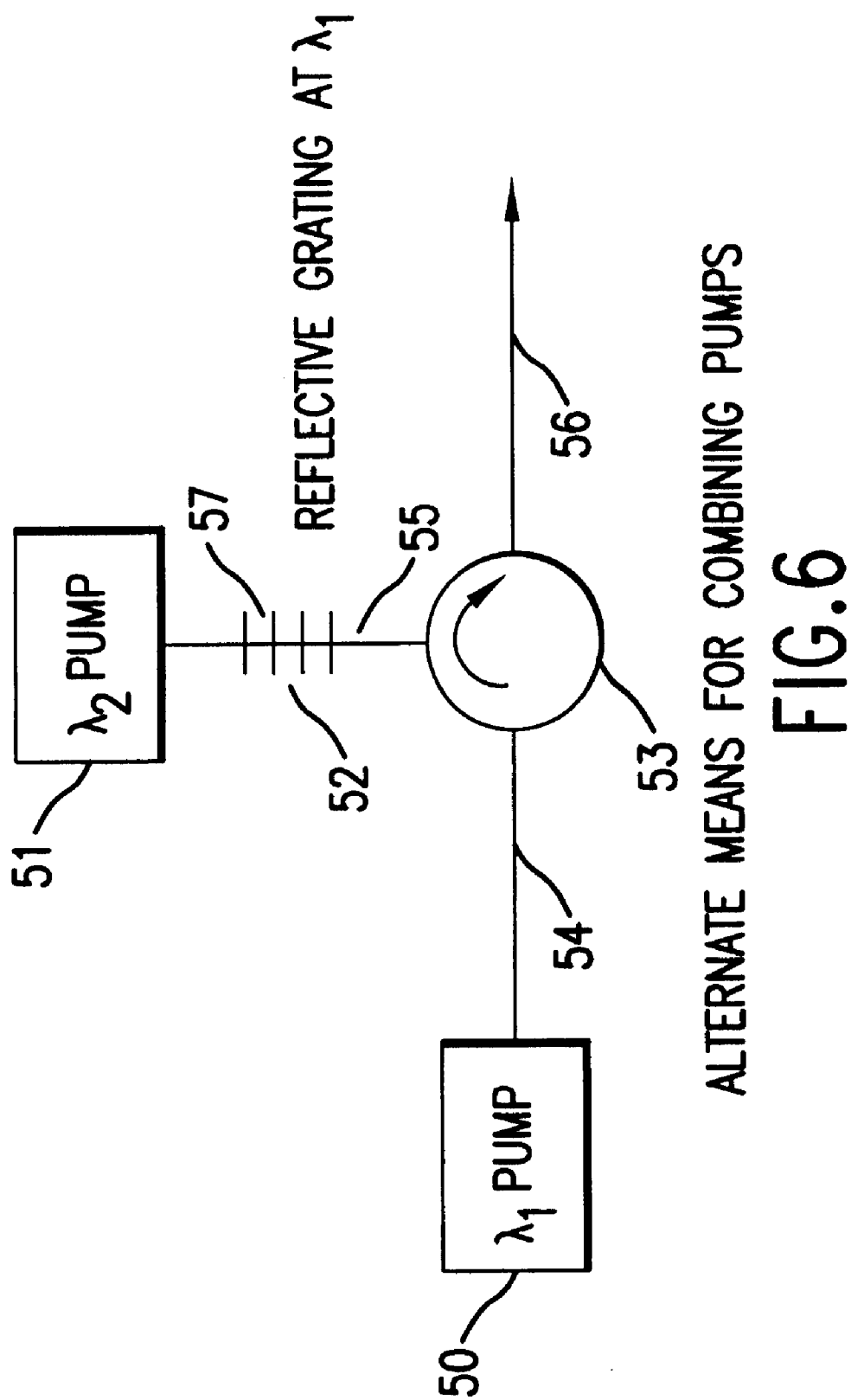
FIG. 6 shows the pertinent details of an alternative embodiment of the invention.

In an alternative embodiment of the invention, the coupler 34 that combines the different pump wavelengths in pump unit 35 may be replaced by a circulator and reflective grating. Specifically, as shown in FIG. 6, pump sources 50 and 51 generating pump energy at wavelengths $\lambda_1$ and $\lambda_2$ are respectively coupled to two ports 54 and 55 of a circulator 53. A reflective grating 57 is disposed between the pump source 51 and port 55 of circulator 53. The reflective grating 57 is tuned to reflect the wavelength $\lambda_1$ generated by pump source 50 and transmit the wavelength $\lambda_2$ generated by pump source 51. In operation, the energy from pump source 50 enters port 54 and is output on port 55. The reflective grating 57 reflects this energy back to port 55 of circulator 53. In accordance with the operation of circulator 53, the combined wavelengths $\lambda_1$ and $\lambda_2$ directed to port 55 exit the circulator 53 on output port 56 so that the combined pump energy may be directed to coupler 31 shown in FIG. 4.

What has been described is merely illustrative of the application of the principles of the present invention. Other arrangements and methods can be implemented by those skilled in the art without departing from the spirit and scope of the present invention. For example, the advantages that accrue by combining optical pump sources is not limited to combining two different wavelengths. More generally, a plurality of pump wavelengths may be used to further tailor the resulting bandwidth of the Raman amplifier.

The invention claimed is:

1. A Raman amplifier, comprising:
    at least a portion of optical fiber in which an optical signal travels;
    a pump energy unit that includes first and second pump sources providing pump power at first and second wavelengths, respectively, said first and second wavelengths generating first and second gain profiles in said optical fiber portion;
    an optical coupler for coupling said pump power to said optical fiber portion; and
    wherein said first and second gain profiles are overlapping.

2. The amplifier of claim 1 wherein said first and second gain profiles are overlapping such that a resulting bandwidth is greater than a bandwidth of each individual gain profile.

3. The amplifier of claim 1 wherein said pump energy unit includes a second optical coupler for combining said first and second wavelengths.

4. The amplifier of claim 1 wherein said pump energy unit further comprises:
    a circulator having first and second input ports and an output port, said first and second input ports being respectively coupled to said first and second pump sources; and
    a reflective grating disposed between said second input port and said second pump source, said reflective grating being configured to reflect optical energy at the first wavelength and transmit optical energy at the second wavelength.

5. The amplifier of claim 1 wherein said optical signal is a wavelength division multiplexed signal and said optical coupler is a wavelength division multiplexing coupler.

6. The amplifier of claim 1 wherein said first wavelength is approximately equal to 1455 nm and said second wavelength is approximately equal to 1495 nm.

7. The amplifier of claim 1 further comprising a third optical source providing pump power at a third wavelength different from said first and second wavelengths.

8. An optical transmission system, comprising:
    first and second transmitter/receiver terminals remotely located with respect to one another;
    an optical transmission path coupling said first terminal to said second terminal;
    a Raman amplifier providing gain to an optical signal in at least a portion of said optical transmission path, said amplifier including;
    a pump energy unit that includes first and second pump sources providing pump power at first and second wavelengths, respectively, said first and second wavelengths generating first and second gain profiles in said optical path portion;
    an optical coupler for coupling said pump power to said optical path portion; and
    wherein said first and second gain profiles are overlapping.

9. The system of claim 8 wherein said first and second gain profiles are overlapping such that a resulting bandwidth is greater than a bandwidth of each individual gain profile.

10. The system of claim 8 wherein said pump energy unit includes a second optical coupler for combining said first and second wavelengths.

11. The system of claim 8 wherein said pump energy unit further comprises:
   a circulator having first and second input ports and an output port, said first and second input ports being respectively coupled to said first and second pump sources; and
   a reflective grating disposed between said second input port and said second pump source, said reflective grating being configured to reflect optical energy at the first wavelength and transmit optical energy at the second wavelength.

12. The system of claim 8 wherein said optical signal is a wavelength division multiplexed signal and said optical coupler is a wavelength division multiplexing coupler.

13. The system of claim 8 wherein said first wavelength is approximately equal to 1455 nm and said second wavelength is approximately equal to 1495 nm.

14. The system of claim 8 further comprising a third optical source providing pump power at a third wavelength different from said first and second wavelengths.

* * * * *